United States Patent Office 3,068,058
Patented Dec. 11, 1962

3,068,058
PROCESS FOR PRINTING POLYHYDROXYLATED FIBERS
Hermann Werdenberg, Basel, Switzerland, assignor to Ciba Company, Inc., Fair Lawn, N.J.
No Drawing. Filed Nov. 27, 1959, Ser. No. 855,494
Claims priority, application Germany Nov. 26, 1958
10 Claims. (Cl. 8—62)

In the last few years a great deal of dyestuffs have become known that are capable of reacting with polyhydroxylated fibers, such as cellulose fibers whether native or regenerated, and fibers made from polyvinyl alcohol in the presence of an alkaline substance in amounts adequate to effect reaction of said dyestuffs with said fibers; and because of this property can be fixed in a solid manner on such fibrous material. It is furthermore known that such dyestuffs are suited for printing the said fibrous material too. In preparing the printing pastes it is advisable to use thickening agents that do not themselves react with the reactive dyestuffs.

It has been found that particular advantages are obtained if prints are made on polyhydroxylated fibers by means of printing pastes containing an alkaline substance and such dyestuffs as are capable of reacting with the said polyhydroxylated fibers, if the said printing pastes are emulsions of the oil-in-water type containing as oily phase a volatile inert organic liquid and as an emulsifier a nonionogenic surface-active compound containing a considerable numer of interconnected —($C_2H_4$—O—) groups.

As dyestuffs suitable for the present process dyestuffs belonging to the most diverse classes come into consideration, for example stilbene, azine, dioxazine, phathalocyanine, perinone, peridicarboxylic acid imide, nitro,trophenylmethane dyestuffs, especially however the acid anthraquinone and azo dyestuffs, including those free from metal and those which are capable of forming complex metal compounds and those actually containing metal bound in complex union, provided the said dyestuffs contain a grouping or a substituent capable of reacting with the polyhydroxylated material. As such substituents or groupings are to be mentioned ethylene imide groupings, epoxy groups, the vinyl group in a vinyl sulfone grouping or in an acrylic acid radical, carbaminic acid aryl ester groupings, isocyanate groups, but particularly such labile substituents as are easily split off with the taking over of the electron pair by which they are linked.

As such labile substituents may be mentioned for example aliphatically bound phosphoric acid or sulfuric acid ester groups, sulfonic acid fluoride groups and especially aliphatically bound sulfonyloxy groups and halogen atoms, particularly aliphatically bound chlorine atoms. Advantageously, the said labile substituents are in γ- or β-position of an aliphatic radical which latter is bound directly or by means of an amino group, a sulfone group or a sulfonic acid amide group to the dyestuff molecule. With the dyestuffs containing halogen atoms as labile substituents the latter may be positioned in an aliphatic acyl radical (e.g. in β-position of a propionyl radical) or in a heterocyclic ring. In the last mentioned instance dyestuffs come into consideration which contain a monohalogenated heterocyclic ring such as a monochloro1,3,5-triazine radical for example of the formula

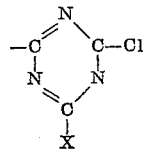

wherein X represents an amino group or a substituted amino group or a substituted hydroxyl group, as well as dyestuffs with a dichloro-triazine radical. A further group of dyestuffs of the kind referred to contains a halogenated pyrimidine ring, e.g. of the formula

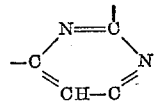

or

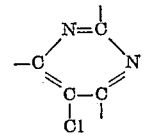

where one valence bond is attached to the dyestuff molecule and at least one, and preferably both, remaining valence bonds are bound to halogen, especially chlorine.

Particularly good results are often obtained with dyestuffs of the kind referred to if they (if the latter) do not possess affinity for cotton or at least do not have a pronounced affinity for cotton.

A great deal of dyestuffs of the said character are known already or may be obtained according to methods known per se, for example, from dyestuff components already containing such labile substituents, or by introducing such labile substituents or radicals containing such labile substituents into the dyestuff molecule after the dyestuff has been formed, according to known methods. Thus, for example, by reacting azo-dyestuffs or anthraquinone dyestuffs containing an —OH, —SH group or above all an —$NH_2$— group capable of reacting, with chloroacetyl chloride, with β-bromo or β-chloro propionylchloride with syanuric chloride or with primary condensation products from cyanuric chloride containing two chlorine atoms and instead of the third chlorine atom an organic radical, valuable condensation products are obtained that contain a reactive chlorine atom and may be used in the present printing process. The dyestuffs containing a sulfonylated hydroxyl group may for example be prepared by reacting one molecular proportion of a dyestuff containing a hydroxyalkyl group, such as a sulfonic acid N-hydroxyalkylamide group or a β-hydroxyalkyl sulfone group with at least one molecular proportion of an organic sulfonic acid halide, e.g. p-toluene sulfonic acid chloride, benzene sulfonic acid chloride or ethanesulfonyl chloride, or with concentrated sulfuric acid or with chlorosulfonic acid in such a manner that the hydroxyl group is acylated. Groupings of the formula D—$SO_2$—$NH_2$—$C_2H_4$—O—$SO_3H$ wherein D stands for the dyestuff molecule may also be obtained by reacting the acid chlorides D—$SO_2Cl$ with aminoethylsulfates with the addition of alkali.

The selection of the alkaline substances which are to be added to the printing preparations according to the present process, depends primarily on the degree of reactivity of the dyestuffs used as well as on the requirements concerning the stability of the printing preparations. One may use for example such substances, preferably of inorganic character, as are practically neutral at room temperature the alkaline reaction of which only develops at the higher temperatures used for drying and especially in steaming, e.g. sodium bicarbonate. In many instances normal alkalai carbonates, such as potassium or sodium carbonate may be used, and in certain instances it may be indicated to use more strongly alkaline substances, such as sodium hydroxide or trisodium phosphate, or buffer mixtures of disodium and trisodium phosphates which may be more suitable for obtaining a predetermined pH-value than more dilute solutions of stronger alkaline substances.

The emulsion of the oil-in-water type which in the present process functions as thickening in the printing preparations may be obtained in a known manner by means of volatile inert organic liquids practically immiscible with water. It is of advantage to select the boiling point and the volatility of the organic liquid in such a manner that on the one hand the preparation of the emulsions at room temperature is not disturbed by excessive evaporation and that on the other hand the normal drying conditions usual in print work will suffice. Thus, for example may hydrocarbons of aromatic, hydroaromatic, heterocyclic acid especially of aliphatic character may be used the boiling point of which is between about 90° and 130° C. Generally speaking, it is advantageous to select boiling points between about 110° and 170° C. Of course, mixtures of different liquids may be used too, such as benzine fractions with a boiling range from about 120°–160° C. usually called lacquer benzine.

If desired, the emulsion may be prepared alone as a kind of stock thickening, or the emulsification of the organic liquid can be brought about in a printing preparation already containing dyestuff and if desired further additions and the alkaline agent necessary for use. It may be appropriate to add stronger alkalies to the printing preparation only at the end of its manufacture.

In any case the intensive mixing and stirring devices known to be useful for emulsifying may be employed, for example homogenizers and especially high speed stirrers with propeller blades sometimes called lightening mixers.

Emulsions possessing of especially good properties for practical purposes are obtained by using the emulsifiers mentioned above which are non-ionogenic compounds of surface active character containing a considerable number of interconnected —(C₂H₄—O—) groups. Such compounds or mixtures of such compounds similar to each other are known and may be obtained by the addition of ethylene oxide to aliphatic compounds or to compounds containing at least an aliphatic chain and containing a reactive hydrogen atom, for example alcohols of higher molecular weight e.g. containing at least 10 carbon atoms in the molecule. The members of this group of alcohols that are readily obtainable industrially such as cetyl alcohol, oleyl alcohol or stearyl alcohol may be used, saturated and especially unsaturated products being well suited.

A further known group of such emulsifiers comprises the addition products of ethylene oxide to alkylphenols, wherein the alkyl group preferably occupies the p-position to the phenolic hydroxyl group and may carry for example more than 6 C-atoms, such as in p-tert·octylphenol and in p-nonylphenol.

In many instances it is advantageous to use compounds wherein the number of —(C₂H₄—O—) groups is relatively large and preferably larger than the number of C-atoms in the aliphatic chain present in the starting material.

In many instances it is of advantage to add a thickening agent to the exterior (continuous) aqueous phase of the emulsion for example alginates alrealy used for printing with reactive dyes in purely aqueous preparations and which are known not to interfere with the reactive dyes, furthermore carboxymethyl celluloses of good solubility in water.

When using the emulsifiers according to the present invention the selection may be made from a wide variety of such additional thickening agents. For example many other products known in the art of textile printing such as locust bean meal, tragacanth, starches, starch ethers, etc. may be used and this constitutes a further advantage of the present process because printing preparations made with different thickening agents often behave in a more advantageous manner when the prints are overlapping. In the case of the alginates it is practically insignificant whether products of low or high viscosity are used.

For the rest it may be indicated to add to the printing preparations agents preventing reduction, such as nitrobenzene sulfonic acid salts, or hydrotropic agents, such as urea, and fungicidal and bactericidal substances in the small amounts necessary for the last mentioned purposes. If hard water or water not fully demineralized is used, it may be appropriate to add polyphosphates capable of sequestering calcium ions.

By means of the printing preparations referred to above relatively fine as well as coarse fabrics from polyhydroxylated fibers such as cotton, linen, rayon and staple fibers from regenerated cellulose may be printed according to known methods, for example by hand printing, fiber printing, and especially by means of roller printing. After the usual drying operation steaming may be effected in the known devices for example in a star frame steamer or in a Mathes Olatt apparatus. The steaming period depends on the character and the reactivity of the dyestuff and in favorable circumstances may be less than 5 minutes, whereas under unfavorable cases more than 15 minutes may be required.

After steaming, the prints should be thoroughly rinsed in order to secure the best possible fastness properties. In a first stage it is appropriate to rinse cold until the major part of the adhering dyestuff is removed and in a second stage as far as possible all of the remaining or unfixed dyestuff should be removed near the boiling point.

The following examples illustrate the invention, the parts and percentages being by weight.

*Example 1*

30 parts of the addition product from one molecular proportion of oleyl alcohol and about 80 molecular proportions of ethylene oxide are mixed with 60 parts of the addition product from one molecular proportion of octadecyl alcohol and about 60 molecular proportions of ethylene oxide. From this mixture an aqueous emulsifier solution of about 8 per cent strength is prepared.

Then a solution of 150 parts of an alginate of low viscosity in 820 parts of water is prepared with addition of 30 parts of sodium hexametaphosphate (sequestering polyphosphate). The alginate should be such as to yield a viscosity of about 120,000 cp. at 20° C. in a 15 percent solution.

From 150 parts of the emulsifier solution referred to above, by thinning with 100 parts of water and by stirring in 650 parts of lacquer benzine (boiling range about 120–160° C.) as well as 100 parts of the alginate solution mentioned above 1000 parts of an emulsion serving as a stock thickening are prepared.

In order to prepare a printing preparation the following is done:

50 parts of the sodium salt of the dyestuff of the formula

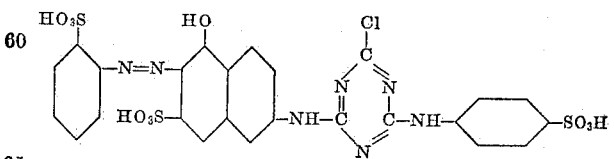

are dissolved in 175 parts of water together with 200 parts of urea and 15 parts of the sodium salt of m-nitrobenzene sulfonic acid. By means of a high speed stirrer, 180 parts of the alginate solution mentioned above are stirred in. While stirring continuously, 30 parts of anhydrous sodium carbonate and finally 350 parts of the emulsion serving as stock thickening (see above) are added.

A cotton fabric is printed with this printing preparation in the usual way and then dried, steamed for 5 to 15 minutes at 101° to 103° C., rinsed cold until the waste water is no longer more than faintly tinted (in running water or by changing the rinsing bath at least 2 to 3 times). Then the fabric is thoroughly rinsed at 90–95° C. in water without additions e.g. three times for 5 minutes, each time in a fresh bath. Then it is again rinsed in a cold bath for a short time and afterwards dried and finished in the usual way. An orange print of good fastness is obtained.

If instead of the dyestuff mentioned above the dyestuff of the formula

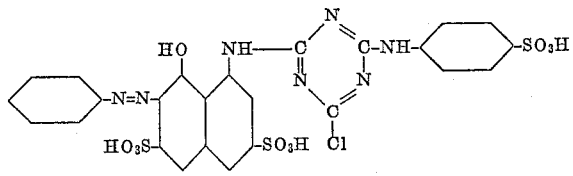

or the dyestuff of the formula

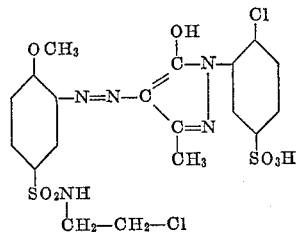

is used, red or yellow prints, respectively, are obtained.

If, for preparing the printing preparation 50 parts of sodium bicarbonate are used instead of the 30 parts of sodium carbonate and as dyestuff that of the formula

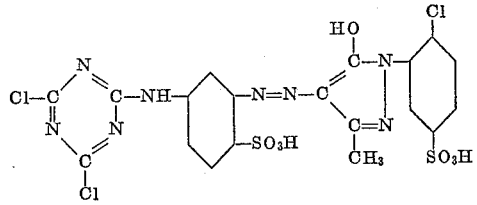

fast yellow prints are obtained.

*Example 2*

100 parts of the addition product from one molecular proportion of oleyl alcohol and about 80 molecular proportions of ethylene oxide, treated for interlinking with about 1.2 percent of hexamethylene-diisocyanate-(1.6) as described in Patent No. 2,946,767 issued July 26, 1960, are molten on the water bath and worked into a concentrated emulsifier solution by adding 700 parts of water. Furthermore, by dissolving 10 parts of an alginate of high viscosity in 200 parts of water, a solution of about 120,000 cp. is prepared.

50 parts of the sodium salt of the dyestuff of the formula

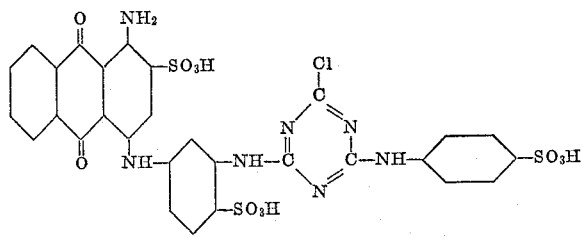

are dissolved in 300 parts of water with addition of 150 parts of urea. 200 parts of the alginate solution and 30 parts of the emulsifier solution mentioned above are added. By means of a highly effective quick-running stirrer 200 parts of lacquer benzine (boiling range about 120–160° C.) are stirred in. After an emulsion is obtained, 60 parts of a 50 percent aqueous potassium carbonate solution, 2 parts of a sodium hydroxide solution of 36° Bé. and 10 parts of m-nitrobenzene sulfonic acid sodium salt are added and stirring is continued until a uniform distribution is achieved.

If the desired consistency or viscosity of the printing preparation is not obtained, the quantity of the emulsifier solution may be raised to 50 or up to about 150 parts and if necessary more hydrocarbon may be added.

By means of this printing preparation a cotton fabric is printed, dried, steamed and rinsed as described in Example 1. A blue print of good fastness is obtained.

A stock thickening may be prepared from 400 parts of the alginate solution mentioned in this example, 100 parts of water, 50 to 300 parts of the emulsifier solution, by stirring in 400 of lacquer benzine, and may be used in a quantity of about 500 grams of stock thickening for every kilogram of printing preparation.

Other prints can be obtained with the dyestuffs of the formulae

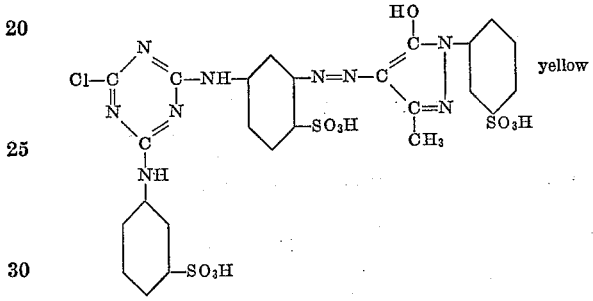

yellow and

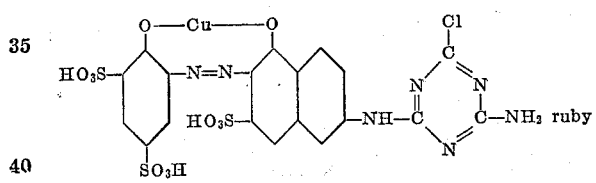

ruby (complex copper compound of the corresponding O,O'-dihydroxy azo dyestuff).

Additional dyestuffs, which may be used, for example in preparations containing 30 grams of dyestuff in one kilogram of printing preparations, are the following which are in part commercial products and in part otherwise known

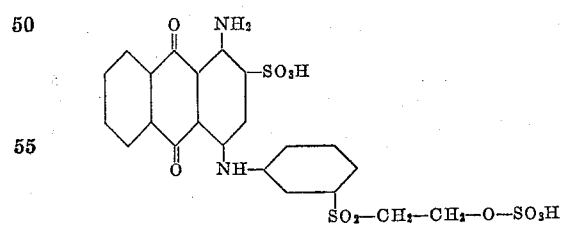

yields a blue print,

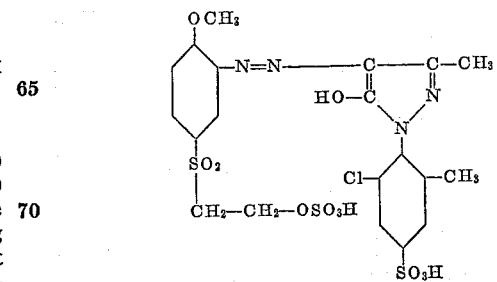

yields a yellow print,

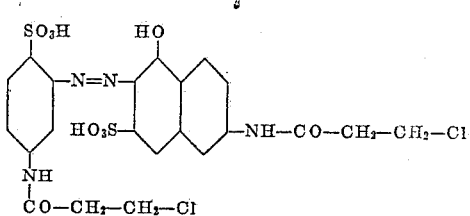

yields a brownish orange print,

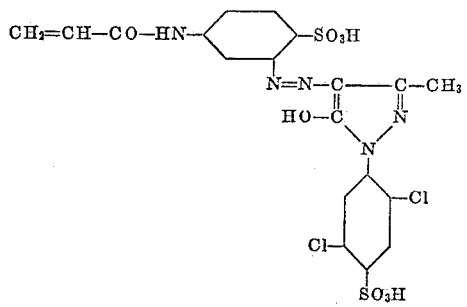

yields a greenish yellow print,

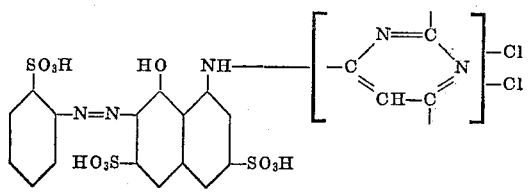

(obtained by coupling 1-(dichloropyrimidyl-)amino-8-hydroxynaphthalene-3,6-disulfonic acid with diazotized 1-aminobenzene-2-sulfonic acid) yields a red print, as well as

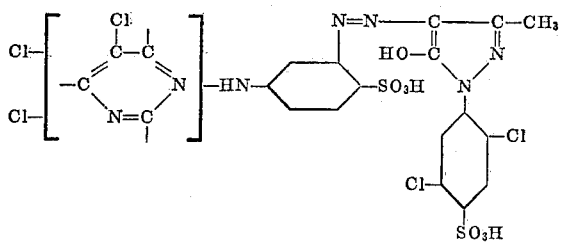

(obtained by condensing tetrachloropyrimidine with the corresponding aminoazo dyestuff) yields a yellow print.

The printing preparations described in the above examples may be used without modification for printing rayon or spun rayon from regenerated cellulose.

What is claimed is:

1. In a process for printing cellulosic fibers by means of printing preparations containing water soluble dyestuffs capable of reacting with the cellulosic fiber, and an alkaline substance in adequate amount to effect reaction of said dyestuff with said fibers, the improvement consisting of thickening the said printing preparations by means of an emulsion of the oil-in-water type containing a water-soluble thickening agent and as oily phase an inert volatile organic liquid and as emulsifier at least one non-ionogenic surface active compound comprising as the essential constituents in its molecule the radical of an aliphatic alcohol having at least 10 carbon atoms per molecule, and from about 60 to 80 —$C_2H_4$—O— groups.

2. The improvement according to claim 1, wherein the printing preparations contain urea.

3. The improvement according to claim 1, wherein the emulsifier is a mixture of the addition products (a) of 1 mole of oleyl alcohol and about 80 moles of ethylene oxide and (b) 1 mole of octadecyl alcohol and 60 moles of ethylene oxide in aqueous solution.

4. The improvement according to claim 1 wherein the alkaline substance is sodium carbonate.

5. Printing preparations containing water soluble dyestuffs capable of reacting with polyhydroxylated fibrous material, and an alkaline substance in adequate amount to effect reaction between said dyestuff and said fibrous material, the said printing preparations being emulsions of the oil-in-water type, wherein the oily phase is an inert volatile organic liquid and the emulsifier is at least one non-ionogenic surface active compound comprising as the essential constituents in its molecule the radical of an aliphatic alcohol having at least 10 carbon atoms per molecule, and from about 60 to 80 —$C_2H_4$—O— groups.

6. Printing preparations according to claim 5, wherein the inert volatile organic liquid has a boiling point above 90° and below 180° C.

7. Printing preparations according to claim 5, wherein the emulsifier is a product obtained by the addition of from about 60 to 80 molecular proportions of ethylene oxide to one molecular proportion of an aliphatic alcohol containing at least 10 carbon atoms in the molecule, the number of molecular proportions of ethylene oxide being greater than the number of carbon atoms in the alcohol molecule, and further reacting the resulting adduct with diisocyanate, thereby interlinking the same with said alcohol and ethylene oxide to form said product.

8. Printing preparations according to claim 7 wherein the diisocyanate is hexamethylene diisocyanate.

9. Printing preparations for textile printing processes, said preparations containing water-soluble dyestuffs which react with polyhydroxylated fibrous material, and an alkaline substance the alkaline reaction of which develops at the latest during the printing process, the said printing preparations being emulsions of the oil-in-water type, wherein the oily phase is an inert volatile organic liquid and the emulsifier is at least one non-ionogenic surface active compound comprising as the essential constituents in its molecule the radical of an aliphatic alcohol having at least 10 carbon atoms per molecule, and from about 60 to 80 —$C_2H_4$—O— groups.

10. An oil-in-water emulsion printing preparation for the printing of polyhydroxylated textile fibers, consisting essentially of water and (a) a water-soluble dyestuff reactive with said hydroxylated fibers, (b) a water-soluble thickening agent which is inert to said fibers, (c) an alkaline substance the alkaline reaction of which develops at the latest during the printing process, (d) an oily phase of a volatile inert organic liquid having a boiling point of from about 90° to 180° C.; and (e) as emulsifier, a non-ionogenic surface-active compound being the addition product of one mole of an aliphatic alcohol having at least 10 carbon atoms, and from about 60 to 80 moles of ethylene oxide;

the ratio of (a):(c) being about 50:30, in parts by weight, and the amount of alkaline substance being about eight to nine times that of the emulsifier present.

References Cited in the file of this patent

UNITED STATES PATENTS

| | | |
|---|---|---|
| 1,970,578 | Schoeller | Aug. 21, 1934 |
| 2,597,281 | Borstelmann et al. | May 20, 1952 |
| 2,619,403 | Krause | Nov. 25, 1952 |
| 2,946,767 | Gassmann | July 26, 1960 |
| 2,965,678 | Sunberg et al. | Dec. 20, 1960 |
| 2,977,353 | Stephen | Mar. 28, 1961 |
| 3,007,762 | Wegmann et al. | Nov. 7, 1961 |

FOREIGN PATENTS

| | | |
|---|---|---|
| 380,431 | Great Britain | Sept. 12, 1932 |
| 380,851 | Great Britain | Sept. 12, 1932 |

OTHER REFERENCES

Schaleppi: Amer. Dyest. Rep., June 2, 1958, page 382.

Robinette: Amer. Dyest. Rep., December 11, 1950, pages 888–890.

UNITED STATES PATENT OFFICE
CERTIFICATE OF CORRECTION

Patent No. 3,068,058

December 11, 1962

Hermann Werdenberg

It is hereby certified that error appears in the above numbered patent requiring correction and that the said Letters Patent should read as corrected below.

Column 1, line 35, for "tro-" read -- tri- --; lines 65 to 70, the formula should read as shown below instead of as in the patent:

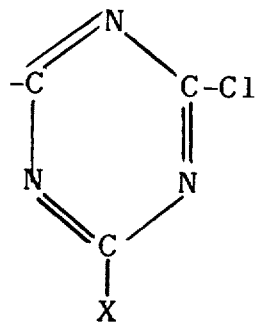

column 2, line 36, for "syanuric" read -- cyanuric --; line 67, for "alkalai" read -- alkali --; column 3, line 13, for "may" read -- many --; line 63, for "alrealy" read -- already --.

Signed and sealed this 29th day of October 1963.

(SEAL)
Attest:
ERNEST W. SWIDER
Attesting Officer

EDWIN L. REYNOLDS
Acting Commissioner of Patents